United States Patent

[11] 3,529,507

| [72] | Inventor | James D. Adams |
| --- | --- | --- |
| | | Colorado Springs, Colorado |
| [21] | Appl. No. | 808,539 |
| [22] | Filed | March 19, 1969 |
| [45] | Patented | Sept. 22, 1970 |
| [73] | Assignee | J.D. Adams Co. |
| | | Colorado Springs, Colorado |
| | | a corporation of Colorado |

[54] METAL GUSSET PLATE
1 Claim, 5 Drawing Figs.

| [52] | U.S. Cl. | 85/13 |
| --- | --- | --- |
| [51] | Int. Cl. | F16b 15/00 |
| [50] | Field of Search | 85/13, |
| | | 11, 49; 287/20.92LP; 85/14 |

[56] References Cited
UNITED STATES PATENTS

| 3,052,149 | 9/1962 | West | 85/13 |
| --- | --- | --- | --- |
| 3,090,088 | 5/1963 | Foley et al. | 85/13X |
| 3,234,841 | 2/1966 | Adams | 85/13 |

FOREIGN PATENTS

| 651,149 | 10/1962 | Canada | 85/13 |
| --- | --- | --- | --- |
| 1,070,079 | 5/1967 | Great Britain | 85/13 |

*Primary Examiner*—Ramon S. Britts
*Attorney*—Richard D. Law

ABSTRACT: A metal gusset plate for connecting wooden structural members, includes a section of planar sheet metal having a series of a plurality of punched-out teeth which are arranged to be driven into the wooden members at each joint for holding the wooden members together. The punched-out teeth are arranged with five teeth from each opening, and each tooth includes planar sides intersecting along a center line of the tooth from its base to its point, and each tooth includes a pair of opposed undercuts for securely holding the teeth into the fibers of the wood.

Patented Sept. 22, 1970
3,529,507
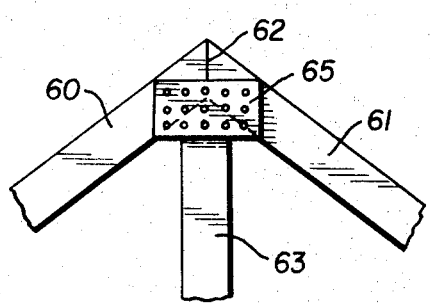
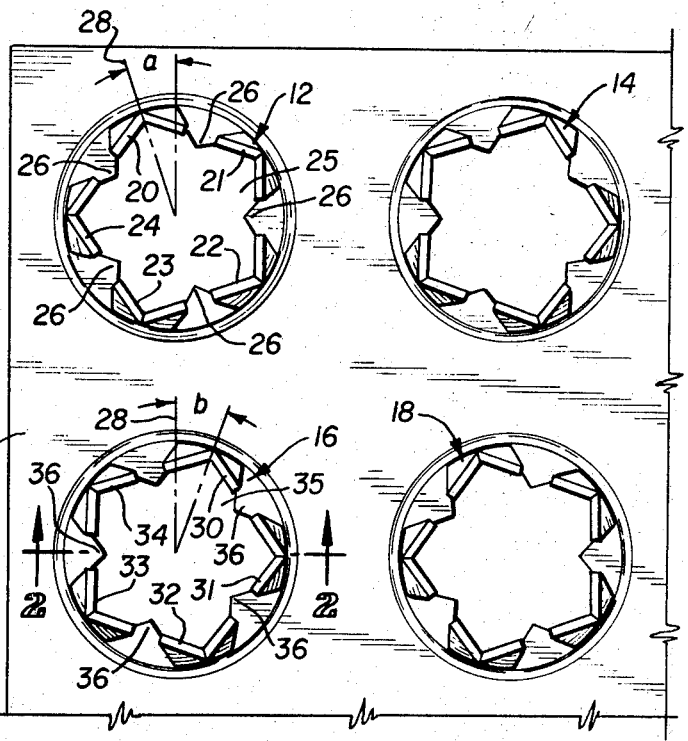
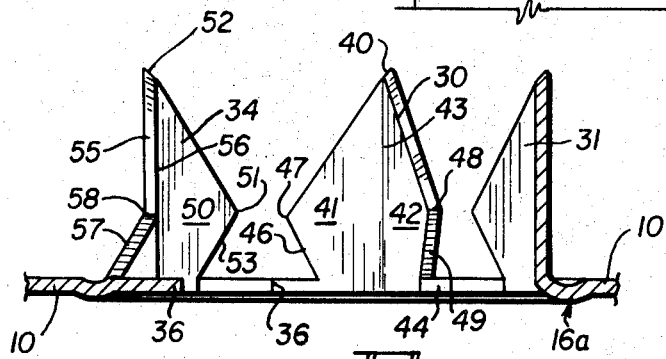
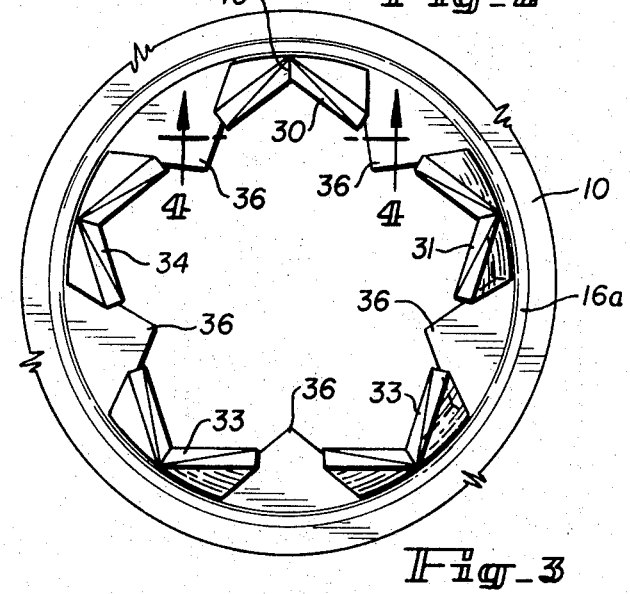
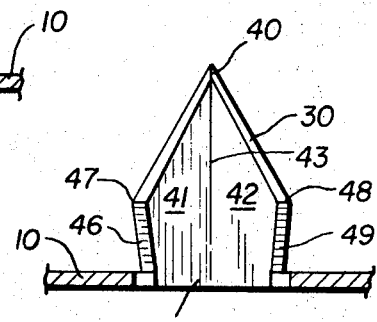
INVENTOR.
JAMES D. ADAMS
BY
Richard D. Law
ATTORNEY

METAL GUSSET PLATE

Wooden structural members for various types of building are used extensively in the building construction. In recent years, metal gusset plates of all types have been used for joining the wooden members together to provide an economical yet high strength structural assembly for wooden frame buildings. Metal gusset plates have been found very useful for connecting wooden members together where the load is essentially a compressional load, and thus most metal gusset plates are used for compression type joints.

According to the present invention I have provided an improved metal connector or gusset plate which has increased strength, increased holding power and which is non-directional in its holding strength. The plate requires few if any nails for securing the gusset plate to the wooden structural members. The improved gusset plate is formed from a relatively thin metal sheet from which is punched a plurality of teeth which are arranged to be driven into the wooden joint. A series of five teeth are punched from a single hole and a plurality of such series may be punched from a plate, being spaced in the plate so as to maintain strength of the plate and not tear too many fibers of the wooden member when driven into the wood. Each tooth is formed of a pair of intersecting planar surfaces forming a longitudinal crease from its base to its point and the planar surfaces are set at an obtuse angle to each other. The edge of each tooth is provided with an undercut extending to its base, forming what amounts to a shoulder for hooking into fibers in the wood. The plate around each punched-out set of teeth is slightly embossed to provide increased strength at the base of the tooth.

Included among the objects and advantages of the present invention is a metal connector plate for wooden members having a plurality of sets of five teeth punched from the plate, each set of teeth being punched from a single hole and each tooth including two planar surfaces intersecting at an obtuse angle from the base to the tip thereof, and each tooth provided with an undercut from a spur for securely fastening into wooden fibers. The adjacent series of teeth may be arranged at slightly different angles so that the teeth penetrate the wood fibers at slightly different angles.

These and other objects and advantages of the invention may be readily ascertained by referring to the following description and appended illustrations in which:

FIG. 1 is a plan view of a portion of a truss showing one use of a gusset plate joining three wooden members together;

FIG. 2 is a bottom plan view of a gusset plate, according to the invention, illustrating the positioning of four sets of teeth punched from the plate;

FIG. 3 is an enlarged detail of a tooth set taken along section line 3—3 of FIG. 2;

FIG. 4 is an enlarged detail view, in plan, of a series of five teeth punched from a single opening in a plate according to the invention; and FIG. 5 is a side elevational view of a single tooth of the series of FIG. 4 taken along section line 5—5.

The plate, shown in FIG. 2, illustrates a small section of plate, which may extend in one or all four directions, depending upon the size requirements for a particular joint. A plate 10, which is relatively thin sheet metal plate of approximately 20 gauge galvinized steel or equivalent, has a series of punched-out teeth therein including four series of five teeth each in general by numerals 12, 14, 16 and 18. The series 12 includes punched-out teeth 20, 21, 22, 23 and 24 arranged equiangularly around an opening 25 from which the teeth are punched. A small land 26 extends inwardly into the opening between each adjacent set of pair of teeth. Each of the teeth extends substantially normally to the plate, and the teeth are rotated at an angle $a$ from a line extending through the center of the series to the center of the series 16. The set 16 includes teeth 30, 31, 32, 33 and 34 which are punched from the plate leaving an opening 35 therein. The teeth of this set are rotated at an angle $b$ from the line 28 which places the teeth at a slightly different angle than the teeth of the set 12. Adjacent teeth sets may be made at the same angle or at different angles to provide a different penetration position of the teeth into the wood.

The shape of the individual teeth are illustrated in FIG. 2, wherein each tooth includes a sharp point 40 formed at the end of intersecting planes 41 and 42 along a crease line 43 which extends from the point 40 to the base 44 of the tooth. Each side of the tooth includes an undercut area from a sharp side point, for example, undercut surface 46 on side 41 from point 47. On side 42 point 48 is provided from the undercut 49 which extends from the point to the base. In a profile view, the tooth 34 includes a planar surface 50 which has a point 51 in between the sharp point 52 at the tip and its base, being formed by undercut surface 53. A planar surface 55 intersects planar surface 50 along a crease line 56. An undercut portion 57 forms a side point 58 and extends back to the plate 10 leaving the land 36 between the points. A straight profile view of tooth 30 is illustrated in FIG. 4 illustrating the configuration of the tooth. To provide additional strength, a slight bulge or annular rib 16a is provided around the periphery of the hole of each tooth set, giving added strength to the base of the tooth.

One example of the use of the plate of the invention is illustrated in FIG. 5 wherein top cords 60 and 61 of a truss are joined together along a mitered joint line 62. A kingpin 63 with a pointed top joins the top cords 60 and 61 at the joint. Plate 65 with a plurality of punched-out teeth sets is placed over most of the joint and is pressed against the wood so that the teeth enter the wood fibers. Normally a pair of plates are put on each side of the joint and the teeth are pressed into the wood by means of a press, which may be a stamp press, a vertical clamp press, a roller press or the like. With the plate of the invention nails are not necessary and nail holes have not been provided in the plate.

I claim:

1. A metal gusset for joining wooden members comprising a thin metal plate having a plurality of openings each spaced a uniform distance from its neighbor distributed throughout the area of said plate, there being five teeth equiangularly punched from the plate at each opening and each of said teeth extending in one direction substantially perpendicularly to the plane of said plate; each tooth formed of two flat planes intersecting along a straight substantially vertical crease extending from a base of each tooth at the juncture of said tooth and said plate to a sharp point at the free extremity of said tooth; each plane of each tooth including an outwardly extending point at the lateral edge thereof remote from the intersection of said planes, said outwardly extending point formed by a straight undercut edge portion from said outwardly extending point to the base of the tooth; a further straight edge portion connecting said extended point to said sharp point; projecting lands in the plane of said plate between each adjacent tooth; said lands extending from the periphery of said openings to a location radially inwardly of said outwardly extending points; a raised, annular rib around the periphery of each of said openings providing added strength to the base of each tooth; and the teeth in adjacent openings being rotated so that the teeth of adjacent openings penetrate the wood fibers at different angles.